United States Patent
Leobandung

(10) Patent No.: US 9,685,410 B2
(45) Date of Patent: *Jun. 20, 2017

(54) SEMICONDUCTOR DEVICE SECURITY

(71) Applicant: International Business Machines Corporation, Armonk, NY (US)

(72) Inventor: Effendi Leobandung, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/795,376

(22) Filed: Jul. 9, 2015

(65) Prior Publication Data

US 2016/0254227 A1    Sep. 1, 2016

Related U.S. Application Data

(63) Continuation of application No. 14/632,507, filed on Feb. 26, 2015.

(51) Int. Cl.
| | | |
|---|---|---|
| H01L 23/544 | (2006.01) | |
| H01L 21/02 | (2006.01) | |
| H01L 21/263 | (2006.01) | |
| H01L 21/28 | (2006.01) | |
| H01L 21/768 | (2006.01) | |
| H01L 21/66 | (2006.01) | |
| H01L 23/00 | (2006.01) | |
| H01L 27/02 | (2006.01) | |
| H01L 29/51 | (2006.01) | |

(Continued)

(52) U.S. Cl.
CPC ...... *H01L 23/544* (2013.01); *H01L 21/02115* (2013.01); *H01L 21/263* (2013.01); *H01L 21/28158* (2013.01); *H01L 21/76831* (2013.01); *H01L 22/10* (2013.01); *H01L 23/5226* (2013.01); *H01L 23/573* (2013.01); *H01L 27/0207* (2013.01); *H01L 29/51* (2013.01); *H01L 21/76814* (2013.01); *H01L 23/53295* (2013.01); *H01L 2223/5444* (2013.01); *H01L 2924/14* (2013.01)

(58) Field of Classification Search
CPC .......................... H01L 23/544; H01L 23/573
See application file for complete search history.

(56) References Cited

U.S. PATENT DOCUMENTS

| | | |
|---|---|---|
| 6,617,172 B2 | 9/2003 | Usami |
| 7,666,722 B2 | 2/2010 | Koyama |

(Continued)

FOREIGN PATENT DOCUMENTS

| | | |
|---|---|---|
| JP | 2002-184872 A | 6/2002 |
| JP | 2005-101657 A | 4/2005 |
| JP | 2006-148090 A | 6/2006 |

OTHER PUBLICATIONS

List of IBM Patents or Patent Applications Treated as Related.

*Primary Examiner* — Yu-Hsi D Sun

(74) *Attorney, Agent, or Firm* — Louis J. Percello; Ryan, Mason & Lewis, LLP

(57) ABSTRACT

Semiconductor device security is provided as follows. A unique identification is generated by randomly forming a plurality of defects in one or more circuit elements of the semiconductor device. This method may yield a semiconductor device which is not susceptible to being replicated or cloned.

19 Claims, 3 Drawing Sheets

(51) Int. Cl.
*H01L 23/522* (2006.01)
*H01L 23/532* (2006.01)

(56) References Cited

U.S. PATENT DOCUMENTS

| | | | |
|---|---|---|---|
| 8,525,169 B1 * | 9/2013 | Edelstein | H01L 23/544 |
| | | | 257/48 |
| 2003/0144760 A1 | 7/2003 | Mangell | |
| 2013/0058147 A1 | 3/2013 | Zhang | |

* cited by examiner

SEMICONDUCTOR DEVICE SECURITY

CROSS-REFERENCE TO RELATED APPLICATION

This application is a Continuation of U.S. patent application Ser. No. 14/632,507 filed on Feb. 26, 2015, the disclosure of which is incorporated herein by reference in its entirety.

FIELD

The present application relates to semiconductor devices, and more particularly to semiconductor device security.

BACKGROUND

The requirement to provide security in computer systems has led to the development of a variety of approaches for uniquely identifying microprocessors and other semiconductor devices that are part of the computer systems. Such approaches have included methods of inserting unique identification codes into integrated circuits of the semiconductor devices used in the computer systems. The challenge in mass producing semiconductor devices, wherein each die has a unique identification, includes maintaining quick manufacturing time, unclonability, and low costs.

Examples of some existing methods of incorporating unique identifications into semiconductor devices are as follows. A unique identification number may be stored in a non-volatile memory of the semiconductor device or fuses on the device may be blown to create the unique identification. However, these methods require additional circuitry on the semiconductor device resulting in increased size and cost of the individual die. Further, these methods typically yield semiconductor devices which are susceptible to being replicated or cloned.

SUMMARY

Embodiments of the invention provide techniques for semiconductor device security.

For example, in one embodiment, a method comprises the following step. A unique identification is generated by randomly forming a plurality of defects in one or more circuit elements of a semiconductor device. In one example, the semiconductor device comprises an integrated circuit such that the integrated circuit is manufactured according to the above method.

Advantageously, illustrative embodiments of the invention yield semiconductor devices which are not susceptible to being replicated or cloned.

These and other objects, features, and advantages of the present invention will become apparent from the following detailed description of illustrative embodiments thereof, which is to be read in connection with the accompanying drawings.

DETAILED DESCRIPTION

It is to be appreciated that the invention is not limited to the specific methods illustratively shown and described herein. Rather, embodiments of the invention are directed more broadly to techniques for generating a unique identification (ID) in a semiconductor device. Moreover, it will become apparent to those skilled in the art given the teachings herein that numerous modifications can be made to the embodiments shown that are within the scope of the present invention. That is, no limitations with respect to the specific embodiments described herein are intended or should be inferred.

Figure 1:
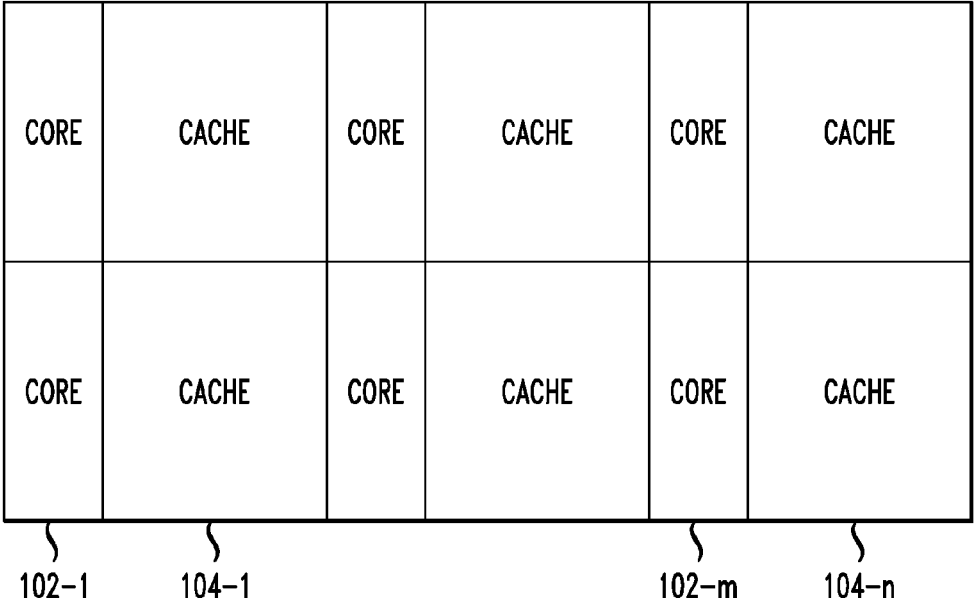
FIG. 1 illustrates core areas and cache areas of a multicore semiconductor device.

FIG. 1 illustrates a typical semiconductor device, for example, a multicore microprocessor, having both core areas 102-1 ... 102-$m$ and cache areas 104-1 ... 104-$n$. The core areas 102 may include both analog and digital logic (processing) circuitry, while the cache areas 104 may include memory circuitry including, but not limited to, DRAM, SRAM, FLASH, etc. Microprocessors may typically have cache memories greater than one gigabyte of storage.

To obtain a secure computing environment, it is desirable to have hardware identification that can be used as, for example, an encryption key, and additionally be non-replicable or non-clonable. For example, the hardware identification generated in an integrated circuit chip may be operative as the key that is used for encryption and/or decryption of data that is transmitted or received by the chip.

Embodiments of the invention intentionally introduce defects into a semiconductor device by using direct electron-beam writes. Electron-beam (e-beam) lithography is a form of maskless lithography which involves scanning a focused beam of electrons to draw custom shapes on a surface covered with an electron-sensitive film called a resist (this is considered exposing the resist). The electron beam changes the solubility of the resist thus enabling selective removal of either the exposed or non-exposed regions of the resist by immersing the resist in a solvent (this is considered developing the resist). The goal is to create very small structures in the resist that can subsequently be transferred to the substrate material via, for example, etching. A primary advantage of e-beam lithography is that it can draw custom patterns (direct e-beam write) with sub-10 nanometer resolution. In accordance with embodiments of the invention, direct e-beam writes are used not to draw custom patterns on a resist but rather to introduce defects directly into existing circuit elements (e.g., vias) of the semiconductor device. Thus, a "defect" as illustratively used herein refers to an intentional fault introduced into a given circuit element of a semiconductor device by, for example, at least one direct e-beam write that causes the given circuit element to not function (partially or completely) as it is intended to function.

Advantageously, defects introduced into one or more existing memory areas will result in failed memory bits. In one example, these failed bits can be detected by writing a predetermined data pattern into the entire memory on the device and then reading the entire memory. The memory cells that do not return the expected data bit from the predetermined data pattern represent the failed memory bits. This writing and then reading (scanning) process to detect the failed memory bits can also be done on a cache area by cache area basis (104-n in FIG. 1). In any event, the detected failed bits are then to be used as the ID of the semiconductor device. For example, the ID in one embodiment may be represented by the locations of the failed bits. The locations could be specified as memory locations and/or physical locations. Control of e-beam writing for the defects is randomized so that each die has a unique ID. The manufacturing time required for creating these defects is small as compared with the total number of e-beam writes for the entire semiconductor device. The resulting unique ID of each device may be mapped and stored by the manufacturer for later use (e.g., to track and manage each chip, to prevent duplicate ID codes in subsequent devices, etc.).

In an illustrative example, a memory may comprise hundreds of thousands of bit lines. Approximately 10 to 100 bit lines may be randomly chosen where the e-beam direct write is used to create the defects. Since a typical memory has bit/word line redundancy, the defects will not impact the memory operation. As an example, if each bit line had 64 bits, then there would be approximately 640 to 6400 cells that have an equal chance of working or failing. The microprocessor, for example, will scan the whole memory array and identify the locations of the failing bits. These locations will be used as the secure chip ID. Defects may be inserted anywhere on the semiconductor device including both the core areas as well as the cache areas in order to create a secure chip ID. An advantage of generating the defects in the cache area, however, is that the memory areas generally have redundancy and therefore no additional chip area is required.

The above described method has the advantage that no additional die area is used and therefore the semiconductor device size does not increase. Another advantage is that the device cannot be replicated or cloned. In order to replicate or clone the device, the location of the defects would have to be known. This would require delayering the device to attempt to find the small intentional defects. However, the delayering process would itself introduce so many defects that it would be difficult, if not impossible, to identify the small intentional defects.

An example of using a direct write e-beam to generate a defect in a metal connection is illustrated in FIGS. 2A through 2E. While examples shown relate to the use of a direct e-beam write, other methods may be used.

Figure 2A:
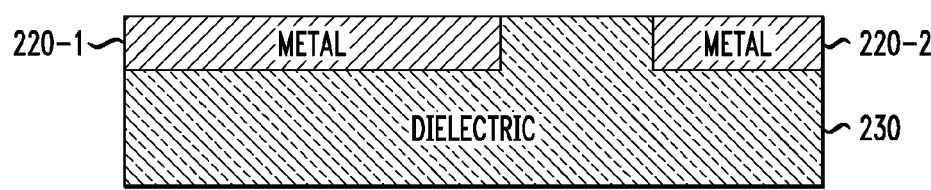
FIG. 2A is a cross sectional view illustrating a semiconductor device after depositing a metal layer, according to an embodiment of the invention.

FIG. 2A shows a cross-sectional view of a semiconductor device 204 according to an embodiment of the invention. As shown, a first metal layer comprising metal lines 220-1 and 220-2 are formed over dielectric layer 230.

Figure 2B:
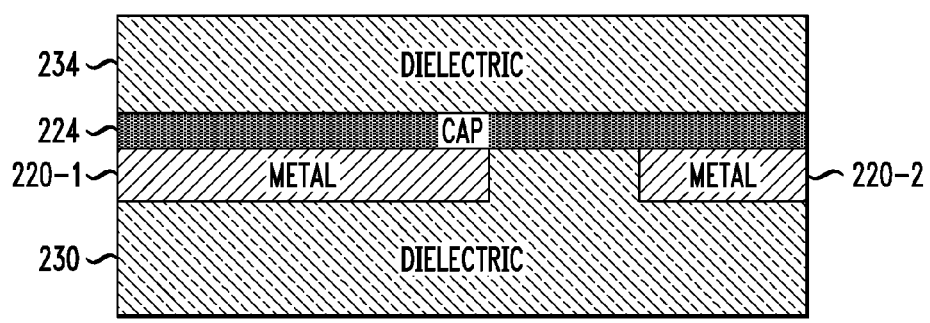
FIG. 2B is a cross sectional view illustrating an embodiment of the device of FIG. 2A after deposition of a cap layer and dielectric layer.

FIG. 2B shows the next step of forming the semiconductor device, in which a cap layer 224 is formed over first metal line 220-1, first metal line 220-2 and dielectric layer 230. Cap layer 224 may comprise nitride or other suitable insulating material. A second dielectric layer 234 is then formed over cap layer 224.

Figure 2C:
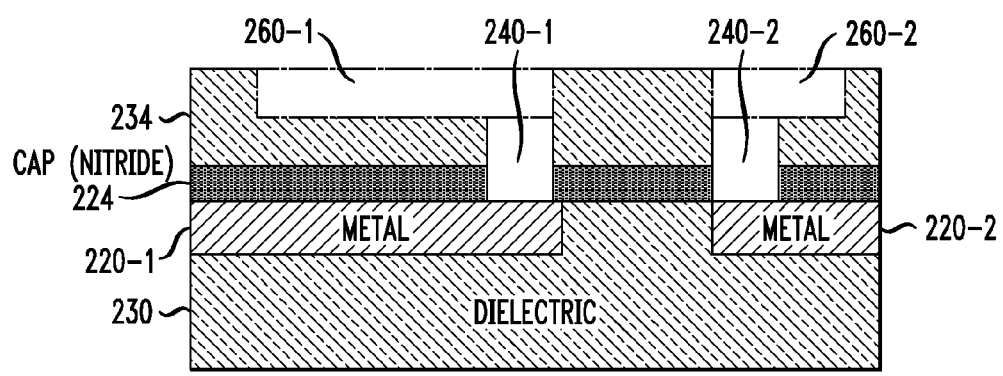
FIG. 2C is a cross sectional view illustrating an embodiment of the device of FIG. 2B after patterning metal and vias.

FIG. 2C shows the step of patterning a second metal layer and vias into second dielectric layer 234. The patterning of the metal lines and vias of the second metal layer may be performed using, for example, a dual damascene process.

Vias 240-1 and 240-2 may be formed using standard lithography and etching techniques. The vias 240-1, 240-2 are arranged to allow electrical connection of the metal lines 220-1 and 220-2 of the first metal layer to be coupled to metal lines in patterned areas 260-1 and 260-2 of the second metal layer respectively. Patterned areas 260-1 and 260-2 are shown in dashed lines, indicating that these areas will be formed later on in the process.

Figure 2D:
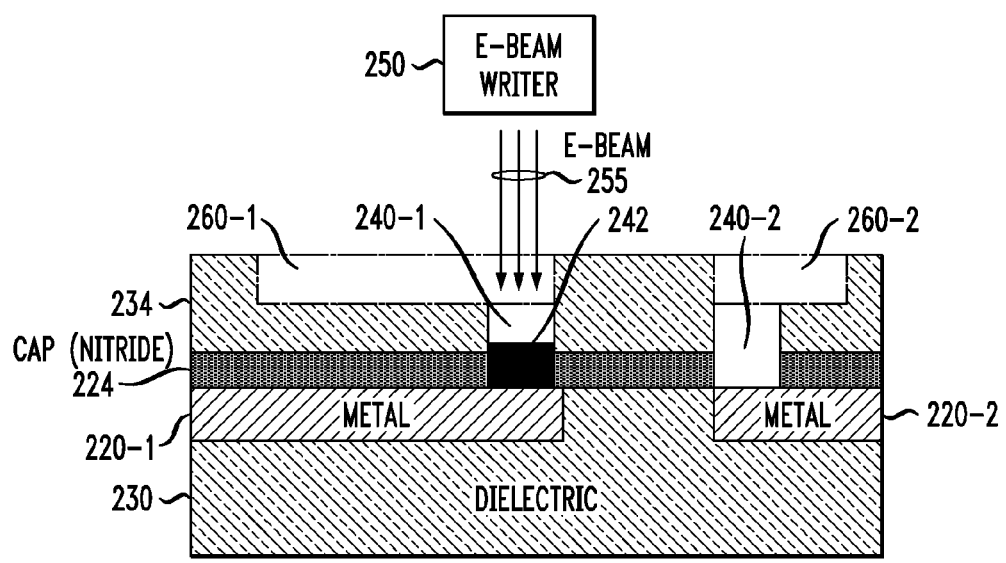
FIG. 2D is a cross sectional view illustrating an embodiment of the device of FIG. 2C after using an e-beam to deposit hardware defects into one or more vias.

In an embodiment of the invention, an e-beam is directed at a randomly chosen via in order to create a defect which will prevent electrical conductivity of a metal on a first metal layer with a metal on a second metal layer. FIG. 2D shows e-beam writer 250 directing e-beam 255 directly at via 240-1. The e-beam 255 causes a defect 242 in the via 240-1 by leaving a deposit of non-conductive material, for example, a contaminant such as a carbon layer, in the via hole. Subsequently, when metal is deposited into patterned metal area 260-1 and via 240-1, no connection will be made to first metal line 220-1. In contrast, when metal is deposited into patterned metal area 260-2 and via 240-2, a connection is established between second metal line 260-2 and first metal line 220-2.

Figure 2E:
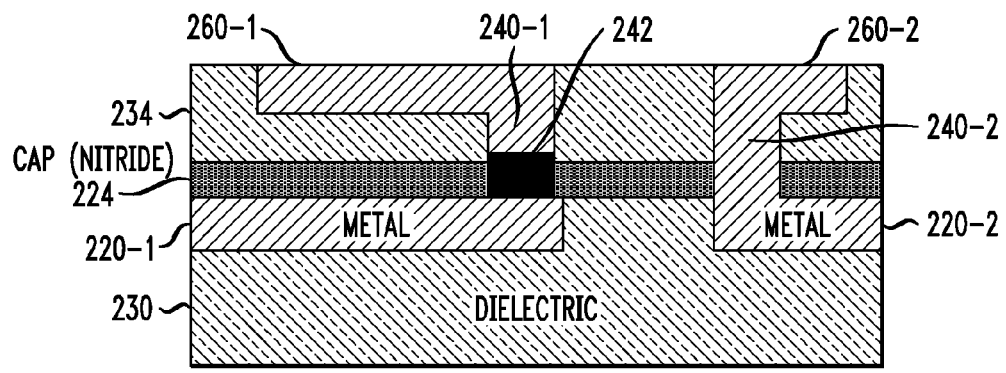
FIG. 2E is a cross sectional view illustrating an embodiment of the device of FIG. 2D after deposition of a subsequent metallization layer.

FIG. 2E illustrates a cross-sectional view after the second metal layer has been deposited. Second metal line 260-1 fails to be coupled to first metal line 220-1 through via 240-1 due to defect 242 (e.g., a carbon layer). The defect 242 prevents electrical conductivity through via 240-1. In contrast, via 240-2, which does not have a defect, allows electrical connection between second metal line 260-2 and first metal line 220-2. Assuming via 240-1 is associated with a memory cell, the defect causes the memory cell to not operate properly and thus return a failed bit, as explained above. While FIGS. 2D and 2E show a single defect, it is to be appreciated that the same or a similar direct e-beam write process is performed at other locations on the device to randomly form other defects, and thus a plurality of defects which represents the unique ID for the device.

While the above describes the formation of a defect in a via, alternate e-beam generated defects may be incorporated. By way of further example only, gate level defects may be formed using the e-beam to damage gate oxide, thereby preventing operation of an associated transistor.

According to embodiments of the invention, defects are introduced into a plurality of randomly selected circuit elements in the semiconductor device. In one embodiment, a random number generator may be used in the random selection process. For example, the random number generator may produce random numbers associated with the location or coordinates of vias in the cache area of a microprocessor. These coordinates may be used to direct the e-beam to one or more locations where a defect is to be introduced. The e-beam writer may also be programmed to avoid going into the core areas (e.g., core areas 102 of FIG. 1). In illustrative embodiments, the defects are introduced, after via patterning but before subsequent metallization processes, into the cache areas of the semiconductor device. In further illustrative embodiments, the plurality of randomly generated defects and natural defects (i.e., existing defects on the semiconductor device not intentionally introduced by direct e-beam writes) can collectively form a unique ID for the semiconductor device. The unique ID may be detected by a system when the memory is scanned.

It is to be appreciated that one or more illustrative embodiments described herein are used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). The chip is then integrated with other chips, discrete circuit elements, and/or other signal processing devices as part of either: (a) an intermediate product, such as a motherboard; or (b) an end product. The end product can be any product that includes integrated circuit chips, ranging from toys and other low-end applications to advanced computer products having a display, a keyboard or other input device, and a central processor.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
    generating an identification uniquely associated with a semiconductor device by forming a plurality of defects in one or more circuit elements of the semiconductor device, wherein generating the identification comprises forming the plurality of defects in the one or more circuit elements in a plurality of random locations, wherein at least one of the plurality of defects is formed by a direct e-beam write and further wherein at least one of the plurality of defects is formed in a via thereby preventing electrical conductivity there through.

2. The method of claim 1, wherein each of the plurality of defects prevents operation of the one or more circuit elements.

3. The method of claim 1, wherein the at least one of the plurality of defects comprises contamination deposited in the via.

4. The method of claim 3, wherein the contamination comprises a carbon layer.

5. The method of claim 1, wherein the identification is at least one of non-clonable and non-replicable.

6. The method of claim 1, wherein the plurality of defects are located in at least one of a cache area and a core area of the semiconductor device.

7. The method of claim 1, wherein the identification is readable by scanning the semiconductor device.

8. The method of claim 1, wherein the unique identification represents a secure encryption key.

9. The method of claim 1, wherein forming the plurality of defects comprises randomizing control of the direct e-beam write to generate the unique identification.

10. The method of claim 1, wherein the direct e-beam write leaves a non-conductive material in the via.

11. A method, comprising:
    forming a plurality of defects in one or more circuit elements of a semiconductor device in a plurality of random locations, wherein at least one of the plurality of defects is formed by a direct e-beam write and further wherein at least one of the plurality of defects is formed in a via thereby preventing electrical conductivity there through;
    scanning the semiconductor device to determine the plurality of random locations where the plurality of defects were formed; and
    uniquely identifying the semiconductor device based on the determined random locations of the plurality of defects.

12. The method of claim 11, wherein each of the plurality of defects prevents operation of the one or more circuit elements.

13. The method of claim 11, wherein the at least one of the plurality of defects comprises contamination deposited in the via.

14. The method of claim 13, wherein the contamination comprises a carbon layer.

15. The method of claim 11, wherein the identification is at least one of non-clonable and non-replicable.

16. The method of claim 11, wherein the plurality of defects are located in at least one of a cache area and a core area of the semiconductor device.

17. The method of claim 11, wherein the identification represents a secure encryption key.

18. The method of claim 11, wherein forming the plurality of defects comprises randomizing control of the direct e-beam write to generate the unique identification.

19. The method of claim 11, wherein the direct e-beam write leaves a non-conductive material in the via.

* * * * *